Figure 1:
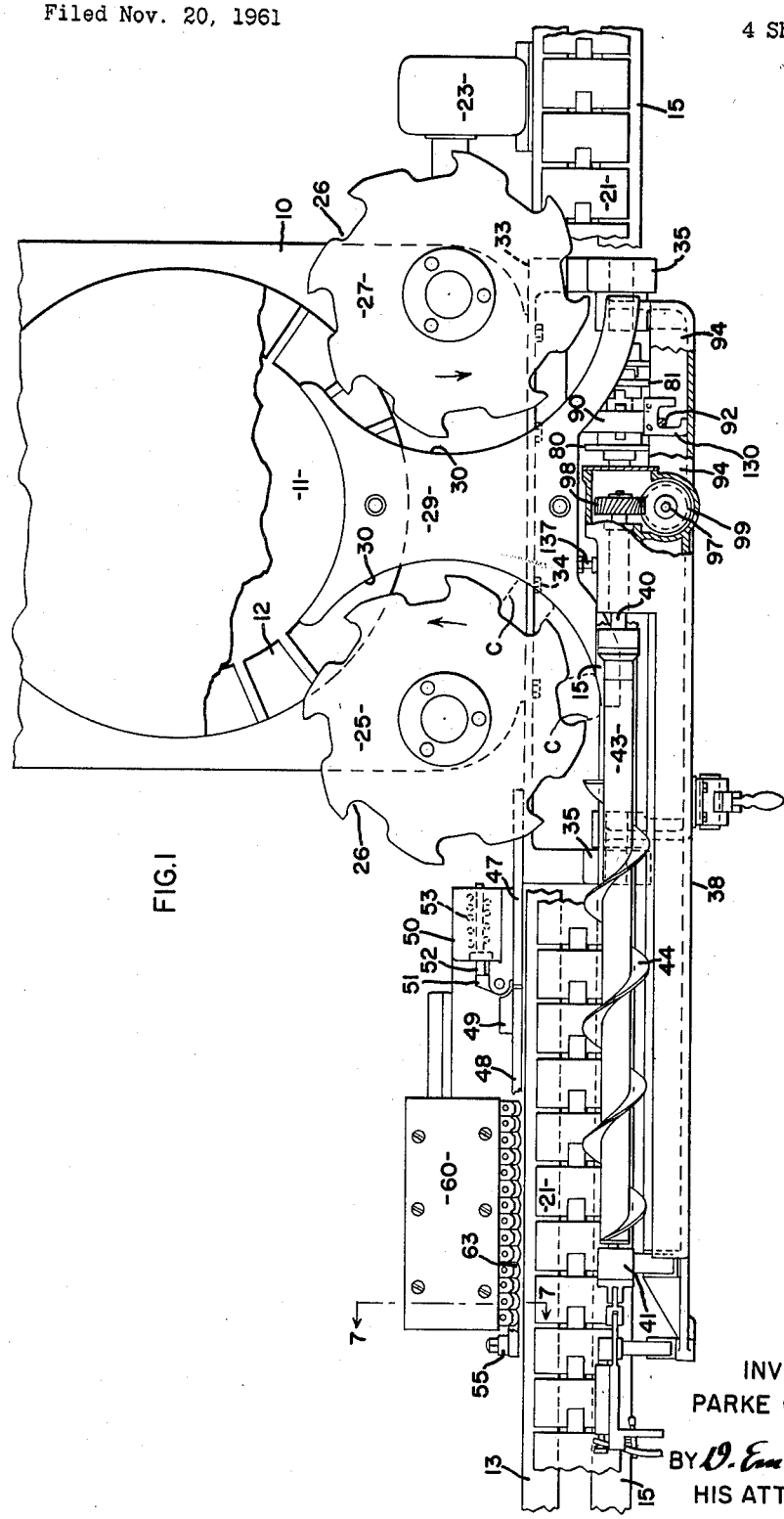

May 12, 1964 P. C. WARNER 3,132,455
IN-FEED MECHANISM FOR CONTAINER CAPPING MACHINES
Filed Nov. 20, 1961 4 Sheets-Sheet 1

INVENTOR:
PARKE C. WARNER,
BY D. Emmett Thompson
HIS ATTORNEY.

INVENTOR:
PARKE C. WARNER,
BY D. Emmett Thompson
HIS ATTORNEY.

May 12, 1964

P. C. WARNER 3,132,455

IN-FEED MECHANISM FOR CONTAINER CAPPING MACHINES

Filed Nov. 20, 1961

4 Sheets-Sheet 4

INVENTOR:
PARKE C. WARNER,

BY D. Emmett Thompson

HIS ATTORNEY.

United States Patent Office 3,132,455
Patented May 12, 1964

3,132,455
IN-FEED MECHANISM FOR CONTAINER CAPPING MACHINES
Parke C. Warner, Fulton, N.Y., assignor to Sealright-Oswego Falls Corporation, Fulton, N.Y., a corporation of New York
Filed Nov. 20, 1961, Ser. No. 153,399
3 Claims. (Cl. 53—201)

This invention relates to apparatus for feeding containers to a container capping machine. In the conventional form of capping machines, as used especially for capping milk bottles, the machine is provided with a circular turret journalled in a base for continuous rotation about a vertical axis. The containers, such as milk bottles, are fed onto the revolving turret in predetermined positions thereon, and there is a circular series of cap applying heads mounted above the turret and rotated in synchronism therewith. Relative vertical movement is effected between each bottle and the associated capping head during a portion of the travel of the bottle in the circular path by the turret, to affix the cap to the top of the bottle, and the capped bottles are discharged from the turret.

Conventionally, a bottle conveyor extends along the front of these capping machines for advancing a procession of uncapped bottles to the machine, and in-feed means is provided for transferring the bottles from the conveyor onto the capping machine turret in timed relation to the rotation of the turret, and an out-feed means is provided for removing the capped bottles from the machine and returning them to the bottle conveyor. The infeed and out-feed means on these capping machines usually consists of wheels, or circular members, rotated about a vertical axis in timed relation to the rotation of the turret, and they are provided at their periphery with container receiving pockets, whereby the containers entering these pockets from the conveyor are moved at the same velocity as the movement of the turret. A machine of this general type is disclosed in Patent No. 2,322,812, to A. A. Barnes, June 29, 1943.

In some instances, an additional in-feed member is employed for correctly spacing the incoming containers on the conveyor and advancing them in timed relation to the in-feed wheel to make more certain that the bottles properly enter the pockets in the in-feed wheel. This preliminary in-feed member may be in the form of a rotating helical member extending along one side of the conveyor in juxtaposition thereto, the helix having a pitch proper to accommodate the size of the container being capped by the machine.

These in-feed arrangements are satisfactory for handling containers of different capacity that do not vary in cross sectional dimension to an appreciable extent. At the present time, however, a considerable volume of milk is packaged for retail in gallon containers. These gallon containers are of much greater cross-sectional dimension than containers conventionally used, such as pint, quart, two quart, and accordingly the existing infeed mechanisms will not handle the large gallon containers.

This invention has as an object an improved in-feed mechanism for container capping machines embodying an arrangement whereby the mechanism is capable of handling containers varying substantially in size and capacity—for example, from half-pint to one gallon.

The invention has as a further object an in-feed mechanism of the type referred to embodying an interlock arrangement requiring the components of the mechanism to be properly correlated in regard to position and speed of operation for a container of given size.

The invention consists in the novel features and in the combinations and constructions hereinafter set forth and claimed.

In describing this invention reference is had to the accompanying drawings in which like characters designate corresponding parts in all the views.

Figure 2:
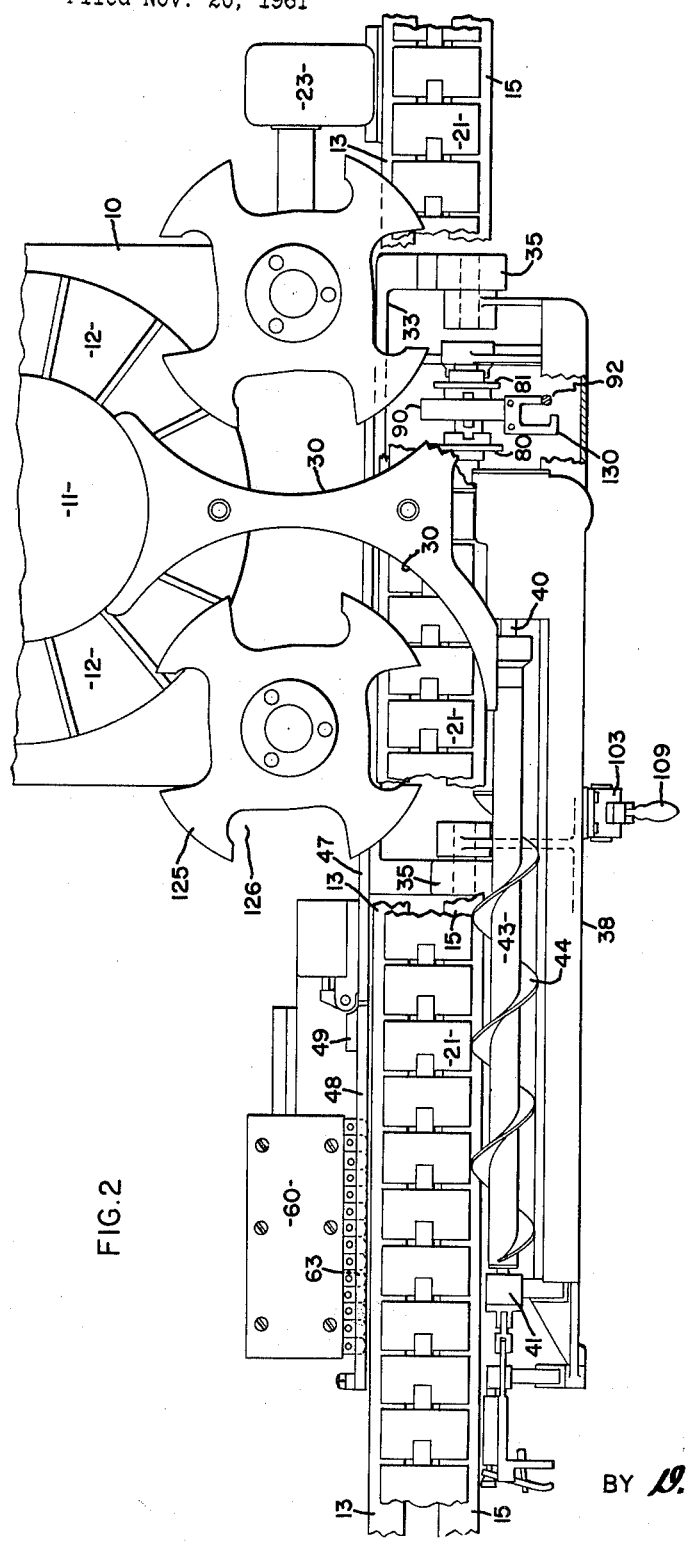
Figure 3:
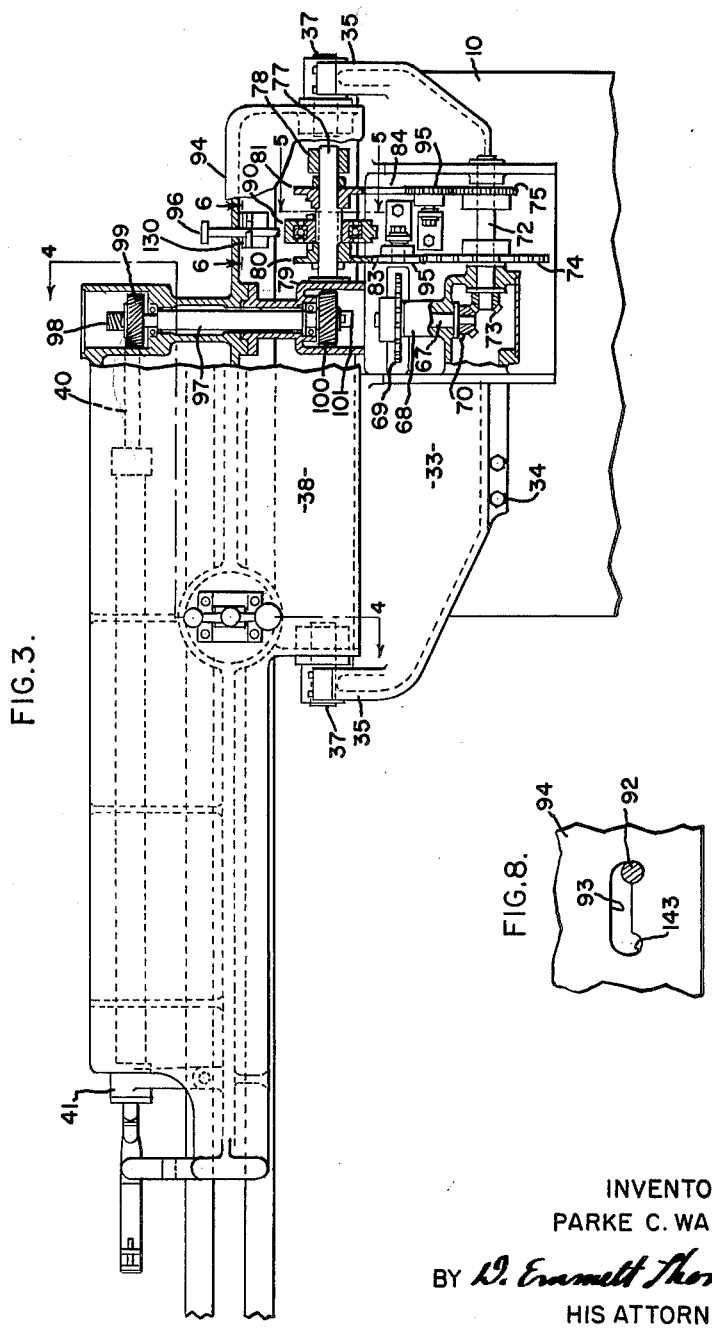
Figure 4:
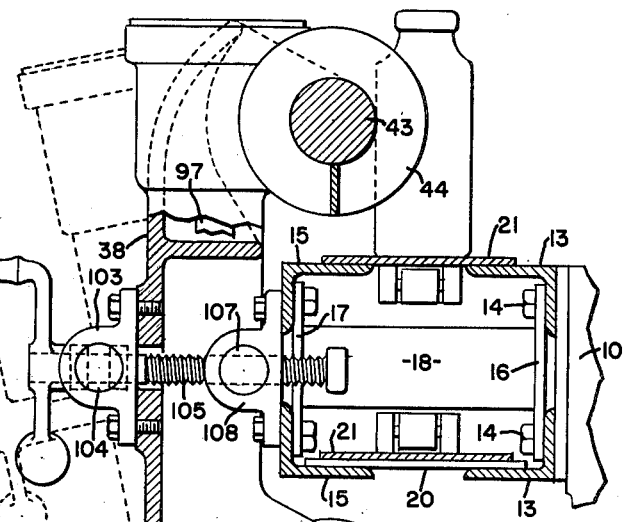
Figure 5:
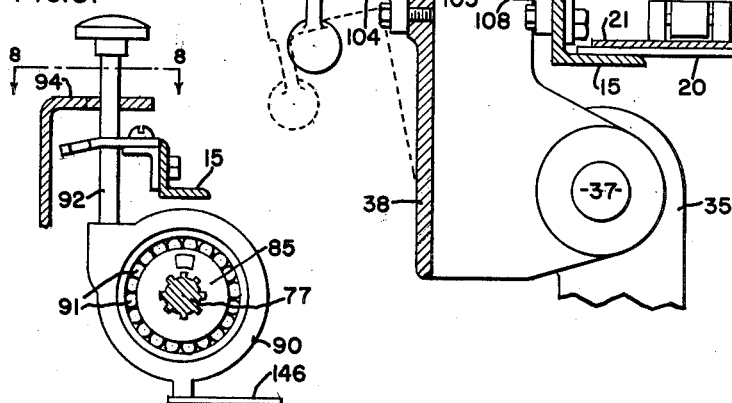
Figure 7:
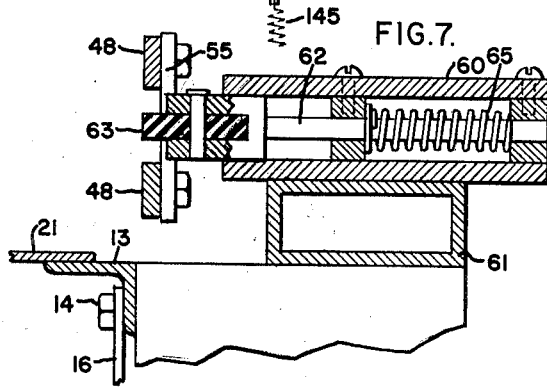
Figure 6:
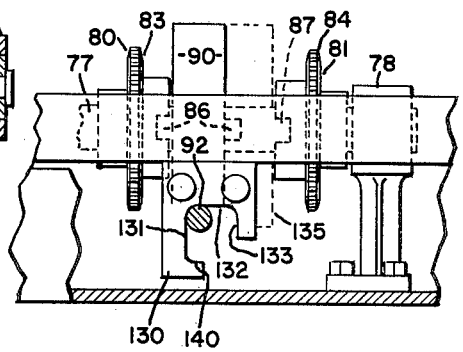

In the drawings—
FIGURE 1 is a top plan view, with parts broken away and parts in section, of a container in-feed mechanism embodying my invention.
FIGURE 2 is a view, similar to FIGURE 1, with the in-feed mechanism adjusted to accommodate containers of larger size.
FIGURE 3 is a front elevational view with parts broken away, and parts in section.
FIGURE 4 is a view taken on line 4—4, FIGURE 3.
FIGURE 5 is a view taken on line 5—5, FIGURE 3.
FIGURE 6 is a view taken on line 6—6, FIGURE 3.
FIGURE 7 is a view taken on line 7—7, FIGURE 1.
FIGURE 8 is a view taken on line 8—8, FIGURE 5.

10 designates the base of a conventional capping machine, on which is journalled for rotation about a vertical axis, a container turret 11 provided in its marginal portion with bottle supporting pads 12.

A bottle guideway extends across the front side of the machine. This guideway consists of a box structure composed of a pair of upper and lower angle iron members 13 fixed to the front of the capping machine, as by cap screws 14, see FIGURE 4. There is a similar pair of angle members 15 extending in spaced parallel relation to the angle members 13. The angle members 13 are connected by plates 16 welded thereto at spaced intervals, and the angles 15 are connected together by similar plates 17. At spaced intervals along the guideway, there are cross plates 18 welded to the plates 16, 17, and a bottom connecting plate 20 is welded to the lower angle members 13, 15. The guideway is completed by an endless bottle conveyor chain 21 operating over sprockets journalled in the ends of the box structure, one of which is power driven from the capping machine through an angle gear box 23, FIGURES 1 and 2.

In FIGURES 1 and 2, the conveyor 21 moves from left to right to advance bottles to an in-feed wheel 25, provided at its periphery with bottle receiving pockets 26. The wheel 25 is rotated in timed relation with the turret 11 and functions to transfer containers C from the conveyor 21 to the pads 12 on the turret. A similar out-feed wheel 27 is employed to transfer capped containers from the turret 11 and return them to the conveyor 21. A guide member 29 is detachably mounted intermediate the in-feed and out-feed wheels, and is formed with curved bottle surfaces 30 for retaining the bottles in the pockets 26 during movement by the in-feed and out-feed wheels. This general arrangement is of conventional form and is shown in Patent No. 2,322,812, previously referred to.

My invention has to do with an in-feed mechanism for advancing a procession of bottles in properly spaced relation, and in proper timed relation to the movement of the in-feed wheel 25, this advancement of the procession being independent of the movement of the conveyor 21. A casting 33 is fixed to the base 10 of the capping machine, as by cap screws 34. This casting is provided with upwardly extending end portions 35 formed with aligned apertures to receive trunnions 37 on a support 38. The support 38 extends upwardly from the pivotal connection 37 in confronting relation to the outer side of the bottle guideway. A shaft 40 is journalled in one end of the upper portion of the support 38, and the support is formed at its opposite end with a movable bearing 41. A bottle timer, consisting of a core 43 and a helical flange 44, mounted on the core, is journalled for rotation in the support 38. One end of the core 43 is detachably connected to the shaft 40 for rotation therewith, and the opposite end of the core is journalled in the removable bearing 41. As bottle containers are advanced by the conveyor 21, they are engaged by the helical flange 44, and the forward movement of the bottles toward the in-feed wheel 25 is then effected by the rotation of the bottle timer. A bottle guide extends along the inner side of the bottle guideway. This guide consists of a fixed bar 47 in proximity to the in-feed wheel 25 and a pair of movable bars 48, fixed to a block 49 pivotally mounted on a casing 50 and having an arm 51 acted upon by a plunger 52 slidably mounted in the casing 50 and acted upon by a compression spring 53, see FIGURE 1. The opposite ends of the guide bars 48 are connected by a vertical bar 55. With this arrangement, the guide bars 48 may be moved in a direction inwardly away from the bottle guide against the action of the spring 53.

A housing 60 is fixed to a support 61 connected to the capping machine. In this housing, there are a plurality of plungers 62 mounted for movement in a direction transversely of the bottle conveyor 21. Each of these plungers carries on the outer end toward the guideway, a rubber bumper 63, positioned intermediate the guide bars 48, see FIGURE 7. The plungers are urged outwardly by compression springs 65. The purpose of this arrangement is, that if a bottle is engaged by the edge of the helical flange 44, rather than being straddled by convolutions of the flange, the bottle can be forced inwardly against the yielding action of the bars 48, and the yielding action of the bumpers 63, whereby the bottle will not be broken while it is temporarily engaged by the edge of the helical flange 44. This action will retard advancement of the bottle, whereby with continued rotation of the bottle timer, the edge of the flange 44 will be moved out of engagement with the side of the bottle, and the bottle will then be permitted to move outwardly intermediate adjacent convolutions of the timer.

The bottle timer 44 is rotated in synchronism with the movement of the turret 11 and the in-feed wheel 25. A shaft 67 is journalled vertically in a hub portion 68, see FIGURE 3, of the casting 33. A sprocket 69 is secured to the upper end of the shaft 67, and a miter gear 70 is secured to the lower end of the shaft. A chain is trained about the sprocket 69, and a sprocket rotated in the base of the capping machine in timed relation to the turret 11. A shaft 72 is journalled in the casting 33 for rotation about a horizontal axis, and is provided at one end with a miter gear 73 arranged in mesh with the gear 70. Sprockets 74, 75, are fixedly mounted on the shaft 72.

A horizontal shaft 77 is journalled in bearings 78, 79, in the support 38. The axis of the shaft 77 is co-incident with the trunnions 37. A pair of sprockets 80, 81, are mounted for free rotation on the shaft 77, and are arranged in alignment with the sprockets 74, 75, respectively. Both of the sprockets 80, 81, have the same number of teeth. However, the sprocket 74 is larger and has greater number of teeth than the sprocket 75. A chain 83 is trained about the sprockets 74, 80, and a chain 84 is trained about the sprockets 75, 81. Accordingly, the sprockets 80, 81, rotate continuously, the sprocket 80 rotating at a higher speed than the sprocket 81. For example, the sprocket 80 may rotate at twice the speed as the sprocket 81. A clutch member 85 has a sliding spline connection with the shaft 77, see FIGURES 3 and 5. The member 85 has axially extending from each side thereof a projection 86, see FIGURE 6. The clutch member 85 is mounted on the shaft 77 intermediate the sprockets 80, 81, and the confronting sides of the hubs of these sprockets are formed with a recess 87, for reception of the projections 86 of the clutch member. It will be apparent from this arrangement that when the clutch member is shifted to the left, FIGURES 3 and 6, there is effected a connection between the shaft 77 and the sprocket 80, whereby the shaft 77 is rotated at the higher speed. When the clutch member is shifted to the right, as indicated by the dotted outline, FIGURE 6, the sprocket 80 is disconnected from shaft 77, and sprocket 81 is connected to the shaft. The clutch member is provided with an annular portion 90, and a circular series of anti-friction balls 91 is arranged in recesses formed on the confronting surfaces of the clutch member and the annular member, see FIGURE 5. A stem 92 extends upwardly from the annular member 90 through a slot 93 formed in a top wall 94 of the support 38, and extending parallel to the shaft 77, see FIGURE 8.

Idler sprockets 95 are provided for maintaining proper tension on the chains 83, 84, see FIGURE 3.

A shaft 97 is journalled vertically in the support 38 and is connected at its upper end to the shaft 40 by helical gears 98, 99. The shaft 97 is connected at its lower end to the shaft 77 by helical gears 100, 101. It will be apparent that the shaft 40 and the helical timer is rotated in timed relation to the turret 11 at a slow speed, or at a fast speed, depending upon the position of the clutch member 85.

In order to accommodate bottles of large size, such as one gallon capacity, it is necessary that the bottle timer be moved outwardly to provide a bottle guideway of sufficient width to accommodate the large bottle. This is accomplished by swinging the support 38 outwardly about the trunnions 37, as to the dotted line position shown in FIGURE 4. A bearing member 103 is secured to the outer wall of the support 38 and contains a trunnion 104 in which is journalled a screw 105. The inner threaded portion of the screw is threaded into a trunnion nut 107 journalled in a bearing member 108 fixed to the angle members 15 of the bottle guideway. A crank handle 109 is fixed to the outer end of the screw for convenient rotation of the latter to move the support 38 into the inner or outer position.

When the in-feed mechanism is adjusted outwardly for the larger container, an in-feed wheel 125 is substituted for the in-feed wheel 25. This in-feed wheel 125 contains a fewer number of pockets 126, and these pockets are of greater dimension than the pockets 26 of wheel 25. For example, in FIGURE 1, the in-feed wheel 25 is provided with eight pockets 26, to accommodate, for example, one quart bottle, whereas the in-feed wheel 125, FIGURE 2, is provided with four larger pockets to accommodate, for example, one gallon containers. Accordingly, it is also necessary to feed these larger containers at half the speed at which the smaller containers were fed. This difference in the speed of the rotation of the timer 44 is controlled by the position of the clutch member 85. When the clutch member 85 is shifted to the left, FIGURE 3, the shaft 77 is rotated at the higher speed by the larger sprocket 74. This higher speed is employed for advancing the smaller size bottles to the in-feed wheel 25 and, by the same token, the support 28 is positioned in its inner position, as shown in full line, FIGURE 4. When the clutch member 85 is shifted to the right FIGURE 3, the shaft 77 is rotated at the slower speed by the sprocket 75 to accommodate the bottles of larger size, and this means that the support 38 has to be swung to the outer dotted line position, FIGURE 4.

In order to assure that the position of the bottle timer 44, and the speed of rotation thereof, are properly correlated, I have provided an interlock mechanism. As previously stated, the stem 92 of the shiftable clutch member 85 extends upwardly through the slot 93 in the top wall 94 of the support 38. A plate 130 is fixedly secured to one of the angle members 15 of the bottle guideway below the slot 93, and is formed with a rectangular opening through which the stem 92 also extends. The width of the opening in the plate 130, in a direction parallel to the shaft 77, is sufficiently in excess of the diameter of the stem 92 as to permit the stem to be shifted from high speed position adjacent the side wall 131 along the inner wall 132 of the opening, toward the right, FIGURE 6, to the neutral position adjacent the side wall 133. An outer corner portion of the plate is removed to provide an opening through which the stem 92 may pass, when it is moved outwardly along the side wall 133. When the stem 92 has thus been moved outwardly past the outer end of the wall 133, the stem may be then shifted to the right, FIGURE 6, to the low speed position, as shown in dotted outline at 135, FIGURE 6.

Due to the fact that the stem 92 extends upwardly through the slot 93 in the support 38, the stem is moved inwardly and outwardly upon such movement of the support. It will, therefore, be apparent that when the stem 92 is shifted to the low speed position, the support 38 cannot be moved inwardly due to the interference effected between the stem and the plate at the outer end of the wall 133. In other words, the stem 92 must be first shifted to the left, FIGURE 6, to neutral position before the support 38 can be moved in by the screw 105. The innermost position of the support 38, and also the helical timer 44 is determined by an adjustable stop screw 137, FIGURE 1, carried by the bottle guide 29.

Sidewall 131 of the opening merges with a wall 140 extending laterally in a direction toward the wall 133. The wall 140 is spaced outwardly from the wall 132 a sufficient distance to allow variation in the position of the support 32 and the timer 44 to accommodate bottles of different sizes advanced by the timer when operated at the higher speed. This variation is effected by adjustment through the screw 105, as will be apparent, and permits the timer to accommodate bottles of varying capacity, such as half-pint, pint, quart and two-quart, all of which are positioned on the turret 11 by the in-feed wheel 25. However, the spacing between the outer wall 140 and the inner wall 132 does not permit sufficient outward movement of the support and timer to accommodate the large gallon capacity bottles. Accordingly, this interlock arrangement prevents the feeding of the large gallon bottles by the timer while it is being rotated by the higher speed.

The slot 93, FIGURE 8, is formed at each end with a circular enlargement 143 which serves as a detent for maintaining the clutch stem in high, or low speed shifted positions. The annular member 90 encircling the clutch 85, and to which the stem 92 is attached, is urged in a crosswise direction, FIGURE 5, by a tension spring 145, the upper end of which is affixed to an arm 146 attached to the member 90, and the opposite end of the spring is attached to a fixed portion of the machine frame.

It will be apparent from the above description that my in-feed mechanism is capable of accurately timing bottles having an appreciable variation in cross-sectional dimension, and that, when the in-feed mechanism is adjusted to accommodate bottles of a larger size, the timer cannot be operated at high speed, and when the clutch member is shifted for low speed rotation of the timer, the timer cannot be moved inwardly to accommodate containers of smaller dimension.

What I claim is:

1. Apparatus for feeding containers of various sizes to a container capping machine, a frame, a fixed linear container guideway extending in juxtaposition to the capping machine, a guide extending along one side of said guideway, a support mounted on said frame at the opposite side of said guideway, a helical container timer journalled in said support and extending in spaced parallel relation to said guide and being operable upon rotation to advance a procession of containers in predetermined spaced relation to the capping machine, motion transmitting means operable to effect rotation of said timer in timed relation to the operation of the capping machine, said motion transmitting means including a member shiftable from a neutral position to a first position to effect rotation of said helical timer member at a predetermined speed for the advancement of large containers, and said member being shiftable from neutral position to a second position to effect rotation of said helical timer member at a higher speed for the advancement of containers of smaller size, said support being movable toward and from said fixed guide to provide a path of varying width to accommodate containers of different size, and means restraining movement of said support when said shiftable member is in said first position, and said means confining said support to limited movement relative to said fixed guide when said clutch is in said second position.

2. Apparatus for feeding containers of various sizes to a container capping machine, a frame, a linear container guideway extending in juxtaposition to the capping machine, a guide extending along one side of said guideway, a support mounted on said frame at the opposite side of said guideway, a helical container timer journalled in said support and extending in spaced relation to said guide and being operable upon rotation to advance a procession of containers in predetermined spaced relation to the capping machine, motion transmitting means connected to said timer and including a clutch member shiftable from a neutral position to a first position for driving said timer at slow speed, and said clutch member being shiftable from neutral to a second position for driving said timer at a fast speed, said support being movable toward and from said guideway to accommodate containers of different sizes advanced along said guideway by said timer, and interlock means restraining movement of said support when said clutch member is moved out of neutral position, said interlock means confining said support to limited movement relative to said guideway when said clutch is moved from neutral position to said second position.

3. In-feed mechanism for feeding containers of various sizes to a container capping machine, a frame, a linear container guideway extending in juxtaposition to the capping machine, a container guide extending along one side of said guideway, a support pivotally mounted on said frame at the opposite side of said guideway, a helical container timer journalled in said support and extending along said guideway in spaced parallel relation to said guide and being operable upon rotation to advance a procession of containers in predetermined spaced relation to the capping machine, said support being movable about said pivotal connection toward and from said guideway to provide a path of varying width to accommodate containers of different sizes advanced along said guideway by said helical timer, motion transmitting means connected to said timer and including a clutch member shiftable from neutral position to a first position for driving said timer at a slow speed, and said clutch member being shiftable from neutral position to a second position for driving said timer at a fast speed, interlock means cooperable to restrain movement of said support toward said guideway when said clutch member is in said first position.

References Cited in the file of this patent

UNITED STATES PATENTS

| | | |
|---|---|---|
| 1,708,313 | Larsen | Apr. 9, 1929 |
| 2,645,399 | Bozek et al. | July 14, 1953 |
| 2,735,600 | Hohl et al. | Feb. 21, 1956 |
| 2,768,656 | Day et al. | Oct. 30, 1956 |